Patented Feb. 8, 1949

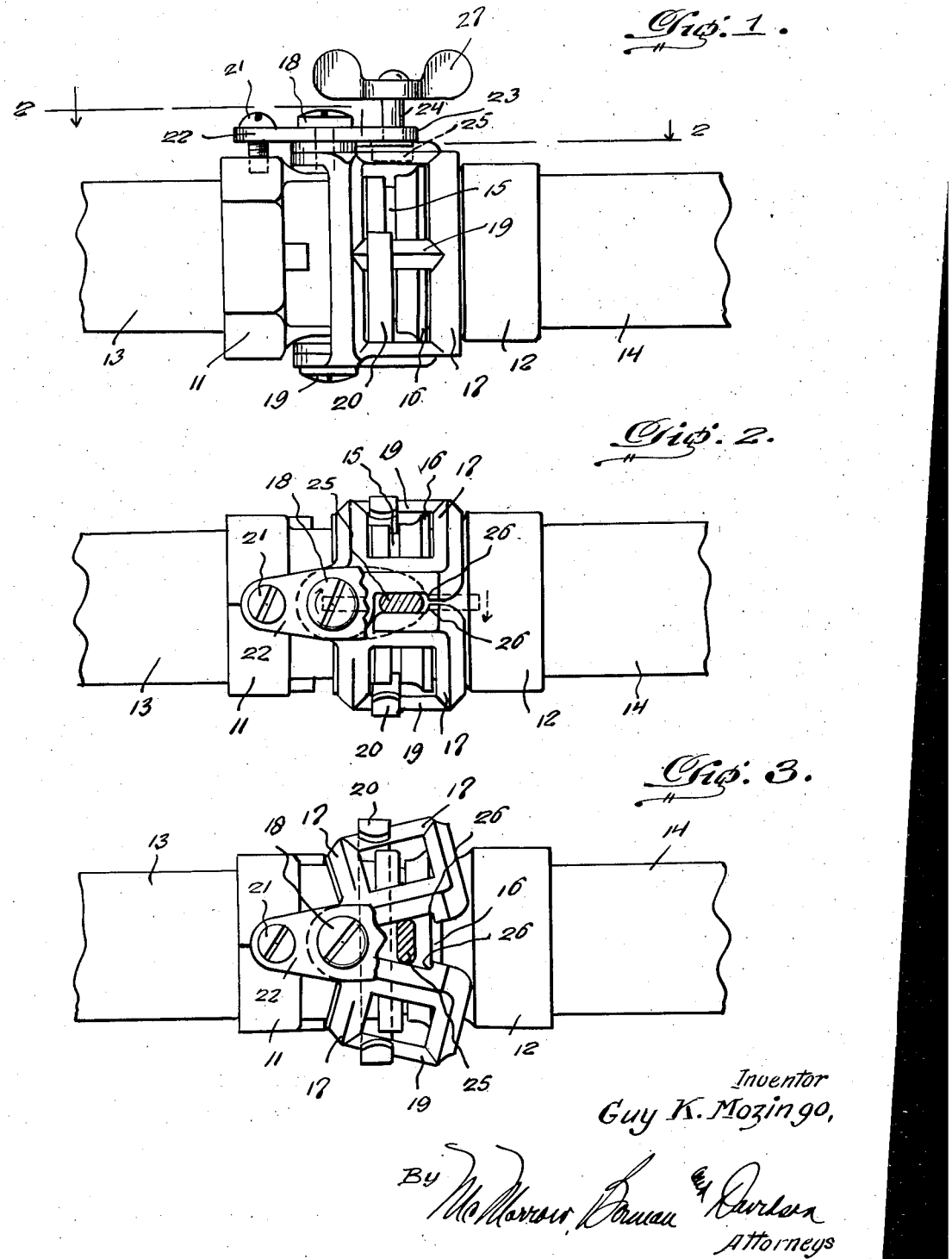

2,461,074

UNITED STATES PATENT OFFICE 2,461,074

HOSE COUPLING

Guy K. Mozingo, Ashtabula, Ohio, assignor of twenty-five per cent to Orville T. Olden and twenty-five per cent to Robert Logston, both of Ashtabula, Ohio Application October 19, 1945, Serial No. 623,272

2 Claims. (Cl. 285—170)

This invention relates to hose coupling devices, and more particularly to hose couplings of the spring clamped type.

A main object of the invention is to provide a novel and improved hose coupling structure of the spring clamped type having means for rapidly and easily unlocking the coupling when it is desired to separate the joined hose sections.

A further object of the invention is to provide an improved release means for hose couplings, said release means being very simple in structure and very efficient in operation.

Further objects and advantages of the invention will appear from the following description and claims, and from the accompanying drawings, wherein:

Figure 1 is a side elevational view of a coupling structure according to this invention.

Figure 2 is a sectional view taken on line 2—2 of Figure 1.

Figure 3 is a view similar to Figure 2 but showing the coupling structure in uncoupling position.

Referring to the drawings, 11 designates the male section of the coupling and 12 designates the female section. Secured to male section 11 is a first section of hose 13 and secured to female section 12 is a second section of hose 14. Male section 11 carries a nipple member 15 adapted to enter female section 12 and make a fluid-tight connection therewith. Female section 12 is formed with a rib 16 adapted to be clampingly engaged by a pair of jaw members 17, 17 pivotally secured by an upper bolt 18 and a lower bolt 19 to male member 11. Jaw members 17, 17 are each formed with a central bar element 19 adapted to be engaged by a C-shaped spring clamp 20 for biasing jaw members 17, 17 to a clamping position with respect to rib 16, thereby locking the male member 11 in coupled relation to the female member 12.

Secured to male member 11 by bolt 18 and by an additional bolt 21 is a plate member 22 formed with a projecting portion 23 extending in the plane between the side portions of jaw members 17, 17. Pivotally mounted on projecting portion 23 is a shaft member 24 formed at its lower end with a key portion 25 adapted to snugly fit between the side portions of jaw members 17, 17, as shown in Figure 2, said side portions being recessed at 26, 26 to receive said key portion 25. The upper end of shaft 24 carries rigidly secured thereto a wing lug 27.

When it is desired to unlock the coupling, wing lug 27 is manually rotated 90°. This causes key portion 25 to spread jaw members 17, 17 apart against the biasing pressure of spring clamp 20 to the unlocked position of said jaw members, as shown in Figure 3. Female member 12 may then be readily disengaged from male member 11.

In coupling the male member to the female member, the jaw members 17, 17 are first separated, as shown in Figure 3, and the male member is engaged with the female member. Wing lug 27 is then turned 90° whereby spring 20 forces jaw members 17, 17 into clamping position with respect to rib 16.

While a specific embodiment of a coupling device has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A hose coupling comprising a male member and a female member, a rib on the female member, a pair of gripping jaws hingedly mounted on the male member and adapted to be moved toward one another for engaging said rib and connecting said male and female member and away from one another for releasing said rib and disconnecting said members, yieldable means urging the jaws toward one another, a key mounted on the male member between said jaws and in one position providing for movement of the jaws into rib-engaging position and in another position actuating the jaws to rib-releasing position, and means for actuating the key.

2. A hose coupling comprising a male member and a female member, an annular rib on the female member, a pair of gripping jaws hingedly mounted on the male member and adapted to be moved toward one another for engaging said rib and connecting said male and female members and away from one another for releasing the rib and disconnecting said members, a spring on the male member and engaging said jaws for yieldably urging the same toward one another, a key mounted on the male member for pivotal movement between said jaws and adapted to be given a quarter turn to spread the jaws against the action of the spring and to be returned to the previous position for releasing the jaws into said rib-engaging relation, and an outwardly-projecting member on the key for actuating the latter.

GUY K. MOZINGO.

REFERENCES CITED

The following references are of record in the file of this patent:

UNITED STATES PATENTS

| Number | Name | Date |
| --- | --- | --- |
| 537,744 | Blackburn | Apr. 6, 1895 |
| 1,428,933 | Bean | Sept. 12, 1922 |
| 2,162,050 | Balas | June 13, 1939 |